(12) United States Patent
Ogino et al.

(10) Patent No.: US 6,756,334 B2
(45) Date of Patent: *Jun. 29, 2004

(54) OPTICAL GLASS

(75) Inventors: Michiko Ogino, Sagamihara (JP);
Yoshio Mori, Sagamihara (JP);
Masahiro Onozawa, Sagamihara (JP);
Junko Ishioka, Sagamihara (JP)

(73) Assignee: Kabushiki Kaisha Ohara, Sagamihara (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/151,162

(22) Filed: May 21, 2002

(65) Prior Publication Data

US 2003/0064879 A1 Apr. 3, 2003

(30) Foreign Application Priority Data

May 29, 2001 (JP) ........................................ 2001-161194

(51) Int. Cl.⁷ ............................ C30C 3/07; C30C 3/072
(52) U.S. Cl. ........................... 501/75; 501/76; 501/901; 501/903
(58) Field of Search ............................. 501/74, 75, 76, 501/901, 903

(56) References Cited

U.S. PATENT DOCUMENTS 5,256,606 A * 10/1993 Maki ........................... 501/60
5,969,861 A 10/1999 Ueda et al.
6,432,854 B1 8/2002 Ueda et al.
6,468,935 B1 * 10/2002 Mori et al. ................... 501/74

FOREIGN PATENT DOCUMENTS

| JP | 62128946 A | * 6/1987 | ............. C03C/3/16 |
| JP | A 04 031338 | 2/1992 | |
| JP | 04031338 A | * 2/1992 | ............. C03C/8/24 |
| JP | A 04 144935 | 5/1992 | |
| JP | A 7-215732 | 8/1995 | |
| JP | A 7-281024 | 10/1995 | |
| JP | A 08 119672 | 5/1996 | |
| JP | A 8-259259 | 10/1996 | |
| JP | A 08 277144 | 10/1996 | |
| JP | A 9-48631 | 2/1997 | |
| JP | A 9-48633 | 2/1997 | |
| WO | WO 95/21137 | 8/1995 | |
| WO | WO 01/40127 A1 | * 6/2001 | |

OTHER PUBLICATIONS

Derwent Abstract 1992–086083, Abstract of JP 4–31338.*
Derwent Abstract 1987–201852, Abstract of JP 62–128946.*
Database WPI Section CH, Week 199248 Derwent Publications Ltd., London, GB; AN 1992–393886 XP00213139 & JP 04 292435 A (CANNON KK), Oct. 16, 1992 *abstract; example 9*.

* cited by examiner

*Primary Examiner*—Karl Group
*Assistant Examiner*—Elizabeth A. Bolden
(74) *Attorney, Agent, or Firm*—Oliff & Berridge, PLC

(57) ABSTRACT

An optical glass includes $SiO_2$; PbO; $B_2O_3$; not less than 0.1 mass % of $TeO_2$; and not less than 0.4 mass % of $Li_2O$.

4 Claims, 1 Drawing Sheet

OPTICAL GLASS

BACKGROUND OF THE INVENTION

1. Field of the Invention

The present invention relates to an optical glass suitable for using for an optical element, such as a lens, a prism or the like, or a substrate. In particular, it relates to an optical glass having a high refractive index, which is suitable for using for an optical element in a polarization optical system, or for a light polarization control element, such as a polarization beam splitter (hereinafter it is called PBS), a spatial light modulation element (hereinafter it is called SLM), a polarization conversion element or the like.

2. Description of Related Art

An optical system utilizing polarization, that is, a polarization optical system, is utilized for various optical instruments, such as a liquid crystal projector or the like. For example, recently, in a projection device, such as the liquid crystal projector or the like, has been made to have high luminance. However, there is a problem that a transmittance of an optical glass used in each portion in the optical system of the projection device deteriorates with time, When a high luminance light having large irradiance is irradiated to an optical glass, for example, an undesirable coloring phenomenon, such as solarization, is often caused, so that the transmittance of the glass deteriorates. Solarization generally points the coloring phenomenon of a glass caused by irradiating a light with a wavelength in an ultraviolet region. However, the coloring phenomenon caused by irradiating a light is reported not only as solarization but also as various coloring phenomenon including the coloring phenomenon of a glass caused by two-photon absorption process with visible light caused when a light with a wavelength in a visible range is irradiated to the glass. In particular, when a light with a wavelength in a visible range is irradiated to a borosilicate glass including lead, it is known that coloring of the glass is easily caused by two-photon absorption. As described above, even though there are various wavelengths of the irradiating light that induce the coloring phenomenon, or various mechanism for causing the coloring phenomenon, deterioration of transmittance of the glass is caused as a result of the coloring phenomenon of the glass caused by irradiating a light.

In order to prevent these various coloring phenomenon, means such as incorporating a filter for cutting a light with a harmful wavelength, which becomes a cause of deterioration of luminance (output) of a light source or a cause of the coloring phenomenon, into the optical system or the like, are considered. However, in the optical system that high luminance is required (for example, an optical system of a high luminance liquid crystal projector), those means are not desirable since those are directly related to deterioration of an amount of an output light.

Further, in the projection device such as the liquid crystal projector or the like, in order to project a high luminance light without loosing its color rendering, the optical glass for using for the optical system is required to have an excellent transmittance to a ray with a wavelength from the long wavelength side to the purple region of the visible range.

Moreover, generally, the optical system of the projection device, such as the liquid crystal projector or the like, is a polarization optical system. It is required to control properties of polarization in high accuracy. Among optical parts of the polarization optical system, when a material having an optical anisotropy is used for a member, such as a prism of a light polarization control element, a substrate or the like, which is required to keep the properties of polarization of the PBS, SLM or the like, a phase difference (optical path difference) between a transmitted principal ray and an extraordinary ray perpendicular to the principal ray is changed as compared with the difference before a principal ray is transmitted through the material. Since the properties of polarization cannot be kept, it is necessary that a material having an optical isotropy should be used for these parts.

Even when optical glasses in earlier technology having an optical isotropy annealed sufficiently and removed strain are used for the optical parts which are required to keep the properties of polarization in the polarization optical system, an optical anisotropy caused by photoelastic effect, that is, a double refraction property, is seen if an absolute value of a photoelastic constant of the glass is large when a mechanical stress or thermal stress is added to those glasses. As a result, there is a problem that it becomes difficult to obtain desired properties of polarization.

The above-described mechanical stress is caused, for example, by joining a material having different coefficient of thermal expansion from a glass to the glass. Further, the above-described thermal stress is caused, for example, by generating heat from peripheral devices, or by generating heat from the glass itself caused by absorption of energy of a transmitted light.

An amount of double refraction which the glass induces by applying these stresses to the glass, can be represented by using the optical path difference. When a (nm) is the optical path difference, d (cm) is the thickness of the glass and F (Pa) is the stress, the following equation (1) holds. The equation (1) means that the more the optical path difference increases, the more the double refraction increases.

$$\delta = \beta \times d \times F \quad (1)$$

The proportional constant ($\beta$) in the equation (1) is called photoelastic constant. The values thereof vary in type of glass. As shown in the equation (1), when the stress (F) applied to the glass and the thickness (d) of the glass are constant, the smaller the absolute value of the photoelastic constant ($\beta$) of the glass is, the shorter the optical path difference ($\delta$) is, that is, the smaller the double refraction property is.

In earlier technology, as a material of an optical part in a polarization optical system, mainly, a borosilicate glass, such as an S-BSL7 (a trade name of the optical glass manufactured by Kabushiki Kaisha Ohara.), or other equivalent glasses manufactured by other companies, for example, a BK7 (a trademark of the optical glass manufactured by Schott Glas), or the like, is used since it has an excellent transmittance to a ray with a wavelength from the long wavelength side to the purple region in the visible range, and it is inexpensive and easy to be acquired. However, these optical glasses have a large absolute value of photoelastic constant ($\beta$). For example, in the S-BSL7, the refractive index (nd) is 1.52 and the value of $\beta$ at e-line (wavelength of 546.07 nm) is $2.79 \times 10^{-5}$ nm/cm/Pa. In order to control the polarization properties at higher accuracy in the polarization optical system, as described above, an optical glass having a smaller absolute value of the photoelastic constant ($\beta$) is required strongly. Further, an optical glass having a higher refractive index is needed from viewpoint of optical design.

As an optical glass having a high refractive index, which has a small absolute value of a photoelastic constant ($\beta$), a glass including a large amount of lead has been known since the beginning of the 20$^{th}$ century. A typical glass of SiO$_2$-PbO system manufactured and sold as a glass including a high amount of lead at present, for example, a PBH53 (a trade name of the optical glass manufactured by Kabushiki Kaisha Ohara.), an SF57 (a trade name of the optical glass manufactured by Schott Glas) which has the same refractive index as the PBH53, or the like, is intended to be used in the polarization optical system as a material for controlling the optical properties in higher accuracy, from the above-described reason. For example, in the PBH53, the refractive index (nd) is 1.85 and the photoelastic constant (β) at e-line (wavelength of 546.07 nm) is less than $0.1\times10^{-5}$ nm/cm/Pa. The PBH53 has a high refractive index, and a sufficiently small absolute value of a photoelastic constant (β) to control the polarization properties, that is, it has a low photoelastic constant.

However, these glasses in earlier technology that include a high amount of lead is bad in a light transmittance from the short wavelength side of the blue region in the visible range to the purple region. For example, in both the PBH 53 and the SF57, the threshold value of the wavelength of a ray which transmits through glasses having a thickness of 10±0.1 mm with a transmittance of 80% including the reflection loss is 440 nm. In the shorter wavelength band than this, the transmittance becomes lower than 80%. When these glasses are used in the polarization optical system, for example, difference in intensities of lights separated in three primary colors, that is, a blue light (B light), a green light (G light), and a red light (R light), in the polarization optical system of a liquid crystal projector or the like, is caused. In order to keep the color rendering of a projected light, in accordance with the blue light (B light) whose intensity is low, the intensities of the other two lights need to be reduced. As a result, there is a problem that the amount of the light projected from a projection device, such as a liquid crystal projector or the like, is not sufficient.

As a glass having a small absolute value of the photoelastic constant (β), other than the above glasses, for example, the Japanese Patent Laid-open Publication No. 7-215732 discloses an optical glass for polarization optical system of SiO$_2$-alkali metal oxide-PbO system. However, this glass shows a high deterioration rate of transmittance (which is the degree of reduction of transmittance before and after transmitting a ray, hereinafter, it may be called an amount of deterioration), Further, also before the deterioration of transmittance is caused, the light transmittance from the short wavelength side of the blue region to the purple region is not sufficient. Moreover, it is difficult to reduce bubbles in a melted glass when the glass is melted and refined. Although it is possible to homogenize the glass by making striae disappear by stirring the melted glass sufficiently, it is not suitable for an optical part since bubbles are remained in the obtained glass.

The Japanese Patent Laid-open Publication No. 9-48631 discloses an optical glass for polarization optical system of PbO-B$_2$O$_3$ and/or Al$_2$O$_3$ system. The amount of deterioration of transmittance in this glass is small, and the light transmittance of this glass is a little better than the glass in the above-described Japanese Patent Laid-open Publication. However, the light transmittance from the short wavelength side of the blue region to the purple region before the deterioration of the transmittance is caused is still not improved sufficiently. Further, bubbles in a melted glass are not reduced sufficiently when the glass is melted and refined. Although it is possible to homogenize the glass by making striae disappear in the same way as the glass in the above-described Japanese Patent Laid-open Publication, it is difficult for using as an optical part since bubbles are remained in the obtained glass.

Further, the Japanese Patent Laid-open Publication No. 8-259259 discloses an optical glass for polarization optical system of SiO$_2$—R$_2$O-PbO-fluorine system. Bubbles in this glass are reduced sufficiently compared with the two glasses in the above-described Japanese Patent Laid-open Publications. However, its amount of deterioration of transmittance is large by far compared with the two glasses in the above-described Japanese Patent Laid-open Publications. This is thought that this is caused by the fluorine component.

Incidentally, an optical glass is generally melted and refined in a container at least a portion of which contacts with a melted glass is made of platinum (a platinum crucible or a tank made of platinum) in order to improve the work efficiency when the glass is melted and refined, and to improve the yield of the glass for manufacturing. In particular, it is general to form a container for refining a glass that needs to be melted at high temperature by platinum.

However, in the PBH53, the SF57, and a glass including a large amount of PbO, such as the glasses in the above-described Japanese Patent Laid-open Publications, particularly, the platinum of a container is melted easily into the glass when the glass is melted and refined. Therefore, the light transmittance tends to be bad.

Therefore, in case of a glass in which bubbles are not reduced sufficiently, such as the glasses in the Japanese Patent Laid-open Publication No. 9-48631 and the Japanese Patent Laid-open Publication No. 8-259259, there is a case that a glass with less or without bubbles can be obtained if the temperature of refining is made high, because the bubbles are reduced sufficiently. However, when the temperature is made high, the light transmittance of the obtained glass becomes worse and worse since the amount of platinum melting in the glass from the container becomes large. On the other hand, when the temperature of refining is made low, the amount of platinum melting in the glass becomes small, and the light transmittance becomes considerably good, however, it is more difficult to reduce the bubbles.

Further, in the glass disclosed in the Japanese Patent Laid-open Publication No. 8-259259, a glass having a good light transmittance can be obtained when the temperature of refining is low. However, the bubbles are not reduced sufficiently, and the amount of deterioration of transmittance becomes large by far since an amount of the fluorine volatilizing from the glass when the glass is refined is small. Further, when the temperature of refining is made high, the bubbles are reduced sufficiently, and the amount of deterioration of transmittance becomes somewhat small since the amount of the fluorine volatilizing from the melted glass becomes large. However, not only the amount of platinum melting in the glass from the container becomes large, but also the light transmittance of the obtained glass becomes extremely bad since the transmittance of the short wavelength band is improved by compounding fluorine in this glass, as disclosed in the same Japanese Patent Laid-open Publication.

SUMMARY OF THE INVENTION

An object of the present invention is to solve the above-described various problems in earlier technology. It is to provide a glass suitable for using for an optical element, such an as a lens, a prism or the like, or a substrate, in particular, a glass with a high refractive index, which is suitable for using for an optical element in a polarization optical system, or for a light polarization control element, such as a PBS, an SLM, a polarization conversion element or the like, the glass whose amount of deterioration of transmittance caused by irradiating a ray in an ultraviolet range and/or a visible range being small, the glass having an excellent transmittance to a ray with a wavelength from a long wavelength side to a purple region in the visible range, and bubbles in a melted glass when the glass is melted and refined are reduced sufficiently and the glass being excellent in a refining property, and furthermore, the glass having a small absolute value of a photoelastic constant (β) in addition to the above-described various properties.

In order to accomplish the above-described object, the inventors have examined and researched an optical glass. As a result, the inventors have unexpectedly found that a glass having an excellent light transmittance, an amount of deterioration of transmittance thereof being small, and bubbles being reduced sufficiently when the glass is melted and refined, and further to the above properties, the glass having a low photoelastic constant is obtained by adding $TeO_2$ and $Li_2O$ to a glass including $SiO_2$, PbO, and $B_2O_3$, the glass including $SiO_2$, PbO, and $B_2O_3$ having been recognized as a glass having a bad light transmittance in a short wavelength side of a visible range for a long time, and the glass including $SiO_2$, PbO, and $B_2O_3$ having been considered that it easily generates coloring by irradiation of a light, that is, deterioration of transmittance. Then, the present invention has been accomplished.

That is, in order to accomplish the above-described object, according to an aspect of the present invention, an optical glass comprises: $SiO_2$; PbO; $B_2O_3$; not less than 0.1 mass % of $TeO_2$; and not less than 0.4 mass % of $Li_2O$.

Preferably, in the present invention, a wavelength of a light which transmits through the optical glass with a transmittance of 80% including a reflection loss is not more than 420 nm when a thickness of the glass is 10±0.1 mm.

Here, the transmittance of 80% may be a value including a reflection loss.

Further, in the present invention, a deterioration rate of transmittance of a ray having a wavelength of 450 nm when a ray in at least one of an ultraviolet region and a visible region is irradiated with an irradiance of 2.2 W.cm$^{-2}$ for ten minutes may be not more than 3.0%.

Here a deterioration rate of transmittance is calculated by (T(b)−T(a))/T(b)×100 when a transmittance of a light with a wavelength of 450 nm before irradiating a light for ten minutes is T(b), and a transmittance of a light with a wavelength of 450 nm after irradiating the light for ten minutes is T(a).

More preferably, in the present invention, a deterioration rate of transmittance of a ray having a wavelength of 450 nm when a ray in at least one of an ultraviolet region and a visible region is irradiated with an irradiance of 2.2 W.cm$^{-2}$ for ten minutes is not more than 1.0%.

Here, a deterioration rate of transmittance is calculated in the same way as the above.

Moreover, in the present invention, an absolute value of a photoelastic constant (β) in a wavelength range of 400 to 800 nm may be not more than 1.0×10$^{-5}$ nm/cm/Pa.

Furthermore, in the present invention, the optical glass may comprise: 18 to 29 mass % of $SiO_2$; 66 to 78 mass % of PbO; 0.1 to 3.5 mass % of $TeO_2$; 0.1 to 6 mass % of $B_2O_3$; and 0.4 to 5 mass % of $Li_2O$. A refractive index (nd) of the glass may be in a range of 1.75 to 1.90.

Preferably, the optical glass may further comprise: 0 to 8 mass % of $Na_2O$; 0 to 8 mass % of $K_2O$; a total amount of $Li_2O+Na_2O+K_2O$ being 0.4 to 10 mass %; 0 to 5 mass % of MgO; 0 to 5 mass % of CaO; 0 to 5 mass % of SrO; 0 to 10 mass % of BaO; 0 to 5 mass % of ZnO; a total amount of MgO+CaO+SrO+BaO+ZnO being 0 to 10 mass %; 0 to 5 mass % of $GeO_2$; 0 to 3 mass % of $Al_2O_3$; 0 to 3 mass % of $Nb_2O_5$; a total amount of $GeO_2+Al_2O_2+Nb_2O_5$ being 0 to 5 mass %; 0 to 1 mass % of $As_2O_3$; and 0 to 1 mass % of $Sb_2O_3$.

Moreover, in the present invention, the optical glass may comprise: 18 to 29 mass % of $SiO_2$; 66 to 78 mass % of PbO; 0.1 to 3.5 mass % of $TeO_2$; 0.1 to less than 2 mass % of $B_2O_3$; 0.4 to 5 mass % of $Li_2O$; 0 to 8 mass % of $Na_2O$; 0 to 8 mass % of $K_2O$; a total amount of $Li_2O+Na_2O+K_2O$ being 0.4 to 10 mass %; 0 to 5 mass % of MgO; 0 to 5 mass % of CaO; 0 to 5 mass % of SrO; 0 to 10 mass % of BaO; 0 to 5 mass % of ZnO; a total amount of MgO+CaO+SrO+BaO+ZnO being 0 to 10 mass %; 0 to 5 mass % of $GeO_2$; 0 to 3 mass % of $Al_2O_3$; 0 to 3 mass % of $Nb_2O_5$; a total amount of $GeO_2+Al_2O_3+Nb_2O_5$ being 0 to 5 mass %; 0 to 1 mass % of $As_2O_3$; and 0 to 1 mass % of $Sb_2O_3$. A refractive index (nd) may be in a range of 1.75 to 1.90.

Further, in the present invention, an Abbe number (vd) of the optical glass may be less than 28.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein.

PREFERRED EMBODIMENT OF THE INVENTION

Figure 1:
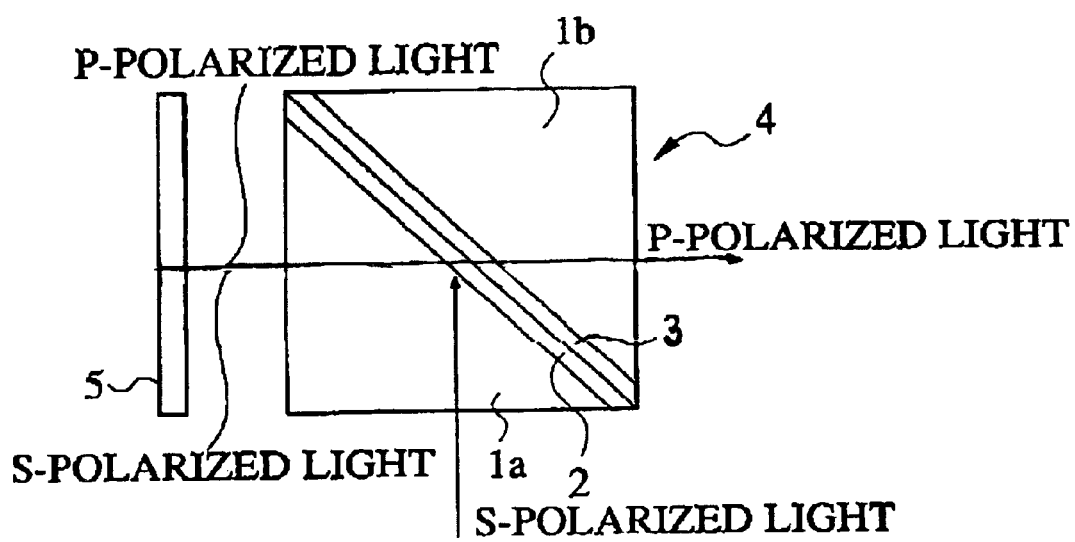
FIG. 1 is an enlarged view showing a principal portion of a polarization optical system of a projection device including an PBS, to which an example of the present invention is applied.

Next, the reason why the composition range of each component is limited as described above in an optical glass according to the present invention will be explained.

The $SiO_2$ component is a glass forming oxide, and is an essential component in the glass according to the present invention. When its amount is less than 18%, it is difficult to make a raw material, in which each component for forming the glass according to the present invention is mixed, into a glass. Further, when its amount is over 29%, the melting property of a glass becomes bad, and the raw material does not become a glass unless it is melted at a high temperature. In particular, in order to make the melting property of the glass good, it is preferable to make its amount up to 27%.

The PbO component has an effect of making a refractive index of a glass high, and is an essential component in the glass according to the present invention. Further, the PbO component also has an effect of making an absolute value of a photoelastic constant (β) of a glass small. When the amount of PbO component is less than 66%, it is difficult to obtain these effects. Further, when its amount is over 78%, the light transmittance deteriorates, and moreover, the absolute value of the photoelastic constant (β) rather becomes large.

The $TeO_2$ component has an effect of making a viscosity small when a glass including a large amount of PbO is melted and refined, and is an extremely important component in the present invention. The refining property or a glass becomes extremely good, that is, bubbles are reduced sufficiently, by compounding the $TeO_2$ component. A glass with very few bubbles or without bubbles can be obtained, and moreover, a glass having an excellent light transmittance to a ray with a wavelength from a long wavelength side to the purple region in the visible range can be obtained. The amount of platinum melting in the glass when the glass is melted and refined becomes small by including the $TeO_2$. This is one of the reasons that the light transmittance of the glass becomes good.

However, when the amount of the $TeO_2$ component is less than 0.1%, it is difficult to obtain these effects. Further, when its amount is over 3.5%, the light transmittance of the glass at the short wavelength side in the visible range rather becomes bad, and moreover, the amount of deterioration of the transmittance of the glass caused by irradiating an ultraviolet light and/or a visible light becomes large. In particular, in order to obtain a glass whose light transmittance is good and amount of deterioration of transmittance is small, it is preferable to make the amount of the $TeO_2$ component up to 3.0%, and more preferably, up to 1.5%.

The $B_2O_3$ component is a necessary component for compounding the $TeO_2$ component in a glass including the $SiO_2$ and the PbO components. The $TeO_2$ component makes the viscosity of a glass small when the glass is melted and refined, as described above. However, when only the $TeO_2$ is compounded in the glass including the $SiO_2$ and the PbO components, the $TeO_2$ component as a raw material tends to remain not being melted. Therefore, it is difficult to obtain a homogeneous glass, and the melting temperature and the refining temperature of the glass must be made high in order to melt the $TeO_2$. However, when the $B_2O_3$ component is compounded, it becomes extremely easy to melt the $TeO_2$. That is, the $B_2O_3$ component has a sufficient effect to obtain the effect of the $TeO_2$ component as described above, since it promotes the melting of the $TeO_2$ in the glass according to the present invention, and can compound a proper amount of the $TeO_2$ in the glass. The $B_2O_3$ component itself also has an effect for making the viscosity of the glass small when the glass is melted and refined.

However, when the amount of the $B_2O_3$ component is less than 0.1%, it is difficult obtain these effects. Further, when its amount is over 6%, the amount of deterioration of transmittance of the glass caused by irradiating an ultraviolet light and/or a visible light to the glass becomes large. Further, in particular, in order to obtain a glass excellent in chemical durability (water resistance, acid resistance, weathering resistance, and detergent resistance), its amount may be less than 2%.

The $Li_2O$ component is an important component found that it has an effect of making the amount of deterioration of the transmittance caused by irradiating an ultraviolet light and/or a visible light to a glass extremely small. Further, the $Li_2O$ component has an effect of promoting the melting of a glass raw material. However, when its amount is less than 0.4%, the above-described effects are extremely small. Further, when its amount is over 5%, the chemical durability (water resistance, acid resistance, weathering resistance, and detergent resistance) of the glass tends to be bad.

The $Na_2O$ and the $K_2O$ components have an effect of promoting the melting of a glass raw material. They can be included arbitrarily if needed. When the amount of each component is over 8%, the chemical durability of the glass becomes bad. Further, when the total amount of the $Li_2O$, $Na_2O$, and $K_2O$ components is over 10%, the chemical durability (water resistance, acid resistance, weathering resistance, and detergent resistance) becomes bad.

When a portion of the PbO component is substituted for R'O component, that is, one or more of MgO, CaO, SrO, BaO, and ZnO components, the absolute value of the photoelastic constant is kept small, and the refractive index can be made low. Therefore, these components can be added arbitrarily if needed. However, when the amount of the MgO component is over 5%, that of the CaO component over 5%, that of SrO component over 5%, that of BaO component over 10%, and that of ZnO component over 5%, the glass is easily devitrified. Further, when the total amount of these five components is over 10%, the glass is easily devitrified, and moreover, it becomes difficult to keep the absolute value of the photoelastic constant small.

The $GeO_2$ component can be added arbitrarily in order to adjust an optical constant (refractive index) highly, and to improve the chemical durability (water resistance, acid resistance, weathering resistance, and detergent resistance) and the resistance to devitrification property of the glass. However, when its amount is over 5%, the melting temperature of the glass becomes high, and the melting property deteriorates.

The $Al_2O_3$ component is an effective component for adjusting the viscosity of the glass highly in accordance with various forming methods of a melted glass, and for keeping excellently the chemical durability (water resistance, acid resistance, weathering resistance, and detergent resistance) of the glass well. It can be added arbitrarily if needed. However, it is not preferable making its amount is over 3% since the glass is easily devitrified.

The $Nb_2O_5$ component is an effective component for increasing the chemical durability (water resistance, acid resistance, weathering resistance, and detergent resistance) of the glass, and for adjusting the refractive index of the glass highly. However, it is not preferable making its amount over 3% since the light transmittance of the glass deteriorates and the degree of coloring becomes large, and the glass is easily devitrified.

Further, it is not preferable making the total amount of the $GeO_2$, $Al_2O_3$, and $Nb_2O_5$ components over 5%, since the resistance to devitrification property of the glass deteriorates.

Each of the $As_2O_3$ and the $Sb_2O_3$ components can be added arbitrarily for obtaining an effect as a refining agent of the glass. However, in order to obtain the refining effect, it is sufficient when the amount of each component is not more than 1%, respectively. In particular, in order to obtain a glass having a good light transmittance, it is preferable to add the $As_2O_3$ component.

Moreover, the $In_2O_3$ and $Ga_2O_3$ components can be added to the optical glass according to the present invention in order to make the refractive index high. However, when the amount of each component is over 3.5%, the light transmittance deteriorates, and the glass is easily devitrified, so that it is not preferable since it is difficult to obtain a homogeneous glass. Further, when the total amount of these two components is over 3.5%, the same result as the above, which is not preferable, is caused.

EXAMPLES

Hereinafter, preferred examples according to the present invention will be explained. In addition, the present invention is not limited to the examples in the following.

At first, optical glasses according to the present invention having composition ratios shown in Table 1 to Table 3 were manufactured.

Raw materials for general optical glasses, such as an oxide, a carbonate, a nitrate, a hydroxide or the like, were weighed and mixed in a predetermined ratio. Then, the mixed material was put into a crucible made of platinum, and melted for about 1 to 3 hours at a temperature of 800 to 1000° C. in accordance with the melting property corresponding to the composition. Next, the melted material was refined for 1 to 3 hours at a temperature of 900 to 1000° C. and reduction of bubbles, that is, defoaming of a melted glass, was performed. Moreover, the melted glass was stirred, and striae were made to disappear. After the melted glass was homogenized, each glass in the Examples No. 1 to No. 20 shown in Table 1 to Table 3 could be obtained easily by casting the glass into a die and cooling the glass slowly (annealing). Each physical property of the obtained optical glasses was evaluated as follows, and the results are shown in Table 1 to Table3.

The evaluated items are the refractive index (nd), the Abbe number (vd), the wavelength of a ray which transmits through the glass with a transmittance of 80% including the reflection loss ($T_{80}$) or the wavelength of a ray which transmits through the glass with a transmittance of 70% including the reflection loss ($T_{70}$), the measured result of the photoelastic constant ($\beta$), the amount of deterioration of the transmittance, and the evaluation of bubbles.

Further, in Table 4, the composition ratios of the comparative examples (No. A to C) which are the optical glasses for polarization optical system in earlier technology having small absolute values of photoelastic constants ($\beta$), are shown with the evaluated results evaluated in the same way as the Examples No. 1 to No. 20. In addition, since the Abbe number (vd) is not an important physical property that much when an optical glass is used for a light polarization control element, only the Abbe numbers (vd) in the Examples (No. 1 to No. 20) according to the present invention are described.

Raw materials for general optical glasses, such as an oxide, a carbonate, a nitrate, a hydroxide or the like, were weighed and mixed in a predetermined ratio. Then, the mixed material was put into a crucible made of platinum, and melted for about 1 to 3 hours at a temperature 1000° C. in accordance with the melting property corresponding to the composition. Next, the melted material was refined for about 1 to 3 hours at a temperature of 1100° C. Moreover, the melted glass was stirred, and striae were made to disappear. After the melted glass was homogenized, each glass in the comparative examples (No. A to No. C) shown in Table 4 could be obtained by casting the glass into a die and cooling the glass slowly (annealing).

The evaluating method will be explained. As for the $T_{80}$ and $T_{70}$, results measured in glass samples with a thickness of 10±0.1 mm, both side of which are polished, are shown. The photoelastic constant ($\beta$) was calculated by setting a light transmission thickness of the glass samples, that is, the thickness (d) in the above-described equation (1), to 0.8 cm, and by measuring the optical path difference caused by double refraction generated when a light in e-line (wavelength of 546.07 nm) is transmitted in a state that a constant stress is given to the glass sample from the outside.

Further, the amount of deterioration of the transmittance is calculated by measuring the light transmittance T(b) of the wavelength 450 nm including the reflection loss of a glass sample with a thickness of 40±0.1 mm, both side of which are polished, and next, by measuring the light transmittance T(a) of the wavelength 450 nm including the reflection loss of the above-described glass sample after irradiating continuously a ray with a wavelength from the ultraviolet range across to the blue region in the visible range, and the ray having irradiance of 2.2 $W \cdot cm^{-2}$, to the glass sample for 10 minutes, and then, by calculating the amount of deterioration of transmittance (%)=(T(b)−T(a))/T(b)×100. As a light source, the Spot UV Curing Equipment—250W direct radiation type (UIS-25103AA made by Ushio Inc.) whose lamp is an ultra pressure mercury lamp was used. Then, the glass sample is set in a position 110 mm remote from the irradiation window in the equipment, and an irradiated light from the above-described Curing Equipment was irradiated to the glass sample.

Further, the evaluated results of bubbles (class) were based upon JOGIS 12-[1994]"measuring method for bubble in optical glass", Japanese Optical Glass Industrial Standards. The diameter and number of bubbles in the obtained glasses were measured by using a microscope. From this result, a total cross sectional area and total number of bubbles in 100 ml of each of the glasses were calculated. Then, the glasses were classified as describing as follows, and the classes are shown as results.

That is, when the total cross sectional area ($mm^2$) in 100 ml was less than 0.03, the glass is classified into the first class, when 0.03 or more and less than 0.1, into the second class, when 0.1 or more and less than 0.25, into the third class, when 0.25 of more and less than 0.5, into the fourth class, and when 0.5 or more, into the fifth class. Further, when the total number of bubbles in 100 ml was less than 10, the glass is classified into A class, when 10 or more and less than 100, into B class, when 100 or more and less than 500, into C class, when 500 or more and less than 1000, into D class, and when 1000 or more, into E class. For example, when the total cross-sectional area is in the first class, and the total number is in A class, it is shown as 1A class.

TABLE 1

| (mass %) Example No. | 1 | 2 | 3 | 4 | 5 | 6 | 7 |
|---|---|---|---|---|---|---|---|
| $SiO_2$ | 18.50 | 20.25 | 27.90 | 28.30 | 23.94 | 22.00 | 27.00 |
| $B_2O_3$ | 6.00 | 1.00 | 1.00 | 0.30 | 3.00 | 0.98 | 0.40 |
| PbO | 73.70 | 77.20 | 69.00 | 68.20 | 68.90 | 70.90 | 70.00 |
| $TeO_2$ | 1.00 | 0.50 | 0.50 | 0.70 | 0.70 | 0.22 | 0.10 |
| $Li_2O$ | 0.70 | 0.55 | 0.50 | 0.40 | 0.80 | 2.20 | 0.90 |
| $Na_2O$ | | 0.20 | 0.10 | | 0.06 | | 0.50 |
| $K_2O$ | | | 0.90 | | | 0.40 | 1.00 |
| BaO | | | | 2.00 | 2.50 | 0.30 | |
| $Nb_2O_5$ | | | | | | 3.00 | |
| $As_2O_3$ | 0.10 | 0.30 | 0.10 | 0.10 | 0.10 | | 0.10 |
| Total | 100.00 | 100.00 | 100.00 | 100.00 | 100.00 | 100.00 | 100.00 |
| nd | 1.853 | 1.882 | 1.834 | 1.829 | 1.823 | 1.849 | 1.839 |
| vd | 24.2 | 22.2 | 24.8 | 25.3 | 25.5 | 23.0 | 24.8 |

TABLE 1-continued (mass %)

| Example No. | 1 | 2 | 3 | 4 | 5 | 6 | 7 |
|---|---|---|---|---|---|---|---|
| $T_{80}$ (nm) | 404 | 410 | 385 | 387 | 393 | 403 | 391 |
| β ($10^{-5}$ nm/cm/Pa) | 0.09 | −0.43 | 0.41 | 0.63 | 0.32 | 0.11 | 0.34 |
| amount of deterioration of transmittance (%) | 0.80 | 1.30 | 0.11 | 0.08 | 0.10 | 0.06 | 0.13 |
| evaluated result of bubbles (class) | 1A | 1A | 1A | 1A | 1A | 1A | 1A |

TABLE 2

(mass %)

| Example No. | 8 | 9 | 10 | 11 | 12 | 13 | 14 |
|---|---|---|---|---|---|---|---|
| $SiO_2$ | 23.30 | 22.00 | 22.00 | 23.04 | 23.04 | 23.04 | 24.59 |
| $B_2O_3$ | 1.50 | 2.00 | 1.70 | 1.50 | 1.50 | 1.50 | 1.00 |
| PbO | 71.20 | 70.00 | 70.00 | 67.10 | 67.10 | 67.10 | 69.00 |
| $TeO_2$ | 2.50 | 0.70 | 0.50 | 1.00 | 0.50 | 0.50 | 0.61 |
| $Li_2O$ | 1.20 | 3.00 | 4.00 | 0.90 | 0.41 | 0.41 | 0.97 |
| $Na_2O$ |  | 2.00 |  |  | 7.15 |  |  |
| $K_2O$ |  |  | 1.00 |  |  | 7.15 | 1.63 |
| BaO |  |  | 0.30 | 6.16 |  |  |  |
| $Al_2O_3$ |  |  | 0.30 |  |  |  | 2.00 |
| $As_2O_3$ | 0.30 | 0.30 | 0.20 | 0.30 | 0.30 | 0.30 | 0.20 |
| Total | 100.00 | 100.00 | 100.00 | 100.00 | 100.00 | 100.00 | 100.00 |
| nd | 1.852 | 1.842 | 1.841 | 1.835 | 1.821 | 1.815 | 1.827 |
| νd | 22.9 | 24.1 | 24.5 | 25.5 | 26.0 | 25.0 | 24.8 |
| $T_{80}$ (nm) | 402 | 394 | 387 | 379 | 383 | 382 | 393 |
| β ($10^{-5}$ nm/cm/Pa) | 0.09 | 0.28 | 0.11 | 0.13 | 0.31 | 0.27 | 0.65 |
| amount of deterioration of transmittance (%) | 0.89 | 0.06 | 0.02 | 0.02 | 0.01 | 0.03 | 0.09 |
| evaluated result of bubbles (class) | 1A | 1A | 1A | 1A | 1A | 1A | 1A |

TABLE 3

(mass %)

| Example No. | 15 | 16 | 17 | 18 | 19 | 20 |
|---|---|---|---|---|---|---|
| $SiO_2$ | 24.00 | 24.00 | 24.00 | 24.00 | 22.11 | 23.04 |
| $B_2O_3$ | 0.50 | 0.50 | 0.50 | 0.50 | 0.50 | 1.00 |
| PbO | 69.20 | 69.20 | 69.20 | 69.20 | 74.00 | 72.08 |
| $TeO_2$ | 0.50 | 0.50 | 0.50 | 0.50 | 0.59 | 1.08 |
| $Li_2O$ | 0.50 | 0.50 | 0.50 | 0.50 | 0.50 | 1.30 |
| $Na_2O$ | 0.50 | 0.50 | 0.50 | 0.50 |  |  |
| MgO |  |  | 4.50 |  |  | 0.30 |
| CaO |  |  |  | 4.50 |  |  |
| SrO | 4.50 |  |  |  |  |  |
| BaO |  |  |  |  |  | 0.80 |
| ZnO |  | 4.50 |  |  |  |  |
| $Al_3O_4$ |  |  |  |  |  | 0.20 |
| $GeO_2$ |  |  |  |  | 2.00 |  |
| $As_2O_8$ | 0.30 | 0.30 | 0.30 | 0.30 | 0.30 | 0.20 |
| Total | 100.00 | 100.00 | 100.00 | 100.00 | 100.00 | 100.00 |
| nd | 1.832 | 1.834 | 1.831 | 1.832 | 1.852 | 1.850 |
| νd | 24.5 | 24.3 | 24.6 | 24.6 | 23.0 | 24.2 |
| $T_{80}$ (nm) | 391 | 392 | 393 | 391 | 401 | 405 |
| β ($10^{-5}$ nm/cm/Pa) | 0.22 | 0.49 | 0.20 | 0.39 | −0.02 | 0.01 |
| amount of deterioration of transmittance (%) | 0.05 | 0.07 | 0.08 | 0.03 | 1.00 | 0.70 |
| evaluated result of bubbles (class) | 1A | 1A | 1A | 1A | 1A | 1A |

TABLE 4

| No. | comparative example A mass % | comparative example B mass % | comparative example B mole % | comparative example C mass % | comparative example C mole % |
|---|---|---|---|---|---|
| $SiO_2$ | 23.90 | 19.00 | 45.70 | 21.60 | 47.70 |
| $B_2O_3$ | | | | 2.60 | 5.00 |
| PbO | 74.00 | 70.40 | 45.50 | 73.70 | 43.90 |
| $Na_2O$ | 0.90 | 0.90 | 2.00 | 0.90 | 1.90 |
| $K_2O$ | 0.90 | 1.30 | 2.00 | 0.90 | 1.30 |
| $As_2O_3$ | | | | 0.30 | 0.20 |
| $Sb_2O_3$ | 0.30 | 3.10 | 1.50 | | |
| $K_2SiF_6$ | | 5.30 | 3.30 | | |
| Total | 100.00 | 100.00 | 100.00 | 100.00 | 100.00 |
| nd | 1.849 | 1.803 | | 1.856 | |
| refining temperature (° C.) | 1100 | 1100 | | 1100 | |
| $T_{80}$ (nm) | 457 | 475 (but $T_{70}$) | | 422 | |
| β ($10^{-5}$nm/cm/Pa) | 0.01 | 0.03 | | 0.04 | |
| amount of deterioration of transmittance (%) | 4.23 | 6.96 | | 0.81 | |
| evaluated result of bubbles (class) | 3E | 2B | | 3E | |

TABLE 5

| No. | comparative example A | comparative example B | comparative example C |
|---|---|---|---|
| refining temperature (° C.) | 1200 | 1020 | 1200 |
| $T_{80}$ (nm) | 460 | 460 | 440 |
| amount of deterioration of transmittance (%) | 4.00 | 15.00 | 3.50 |
| evaluated result of bubbles (class) | 1A | 3E | 1A |

As shown in Table 1 to Table 3, the amount of deterioration of transmittance of each of the optical glasses in the Examples (No. 1 to No. 20) according to the present invention is less than that of the glasses in the comparative examples (No. A and No. B) shown in Table 4. In addition, the value of the $T_{80}$ in each of the Examples is smaller than that of the glasses in the comparative examples (No. A to No. C). Therefore, it is realized that the optical glasses in the Examples according to the present invention are excellent in light transmittance compared with the comparative examples. Moreover, each of the optical glasses in the Examples No. 1 to No. 20 according to the present invention have a photoelastic constant (β) whose absolute value is small enough to use for a light polarization control element, concretely, the value of β is less than $1.0 \times 10^{-5}$ nm/cm/Pa.

As shown in Table 1 to Table 3, all of the evaluated results of bubbles of the obtained optical glasses in the Examples No. 1 to No. 20 according to the present invention are in 1A class. In particular, optical glasses sufficiently used for a very thick optical element, such as a prism or the like, or a PBS made by joining two prisms together, were obtained.

On the other hand, all of the evaluated results of bubbles of the glasses in the comparative examples No. A to No. C are worse compared with the glasses in the Examples No. 1 to No. 20 according to the present invention. In particular, the results in the comparative examples No. A and No. C are bad. Further, although the evaluated result of bubbles in the glass of the comparative example No. B is comparatively good, its light transmittance ($T_{80}$) is extremely bad. Since its spectral transmittance including the reflection loss did not reach 80% from 400 to 500 nm, the above-described $T_{70}$ is shown in Table 4. Moreover, the amount of deterioration of transmittance of the glasses in the comparative examples No. A and No. B are larger than that of the glasses in the Examples No. 1 to No. 20 according to the present invention.

As described above, the evaluated results of bubbles of the glasses in the comparative examples No. A and No. C were extremely bad, and the light transmittance of the glass in the comparative example No. B was extremely bad. Therefore, as for the glasses in the comparative examples No. A and No. C, the refining temperatures were made high in order to reduce the bubbles sufficiently. As for the comparative example No. B, it was considered that its light transmittance would improve if the amount of platinum melting into the melted glass were reduced, so that the refining temperature was made low. These re-experimented results are shown in Table 5. The evaluated results of bubbles of the glasses in the comparative examples No. A and No. C were extremely improved. However, the light transmittance ($T_{80}$) of both glasses became worse, and the amount of deterioration of transmittance also became larger. On the other hand, the light transmittance of the glass in the comparative example No. B became better and the value of ($T_{80}$) could be measured. However, its light transmittance is bad compared with the glasses in the Examples (No. 1 to No. 20) of the optical glasses according to the present invention. Moreover, its amount of deterioration of transmittance became extremely large, and also, its evaluated result of bubbles became extremely bad.

Next, an example that the glass in the Example No. 20 according to the present invention is used as a prism of the PBS which is a light polarization control element, in the polarization optical system of a three plate type reflective liquid crystal projector, will be explained on the basis of FIG. 1. The glass in the Example No. 20 is heated and softened, and is press formed in a die. The obtained formed glass is polished, and six triangular-shaped prisms are made. Two of those prisms are made into one set of PBS, so that three PBSs are made in total. A PBS 4 shown in FIG. 1 is one of those PBSs. In the PBS 4, triangular-shaped prisms 1a and 1b out of the six triangular-shaped prisms are used. On a face where the triangular-shaped prisms 1a and 1b are stuck together, well-known dielectric multilayer films 2 are formed, and the triangular-shaped prisms 1a and 1b are stuck together by a bonding layer 3. Thereby the PBS 4 is made. The other two PBSs (not shown) are made in the same way by using the rest four triangular-shaped prisms (not shown).

Next, an operation of the PBS 4 shown in FIG. 1 will be explained. At first, a light emitted from an ultra pressure mercury lamp (not shown) is passed through a micro lens array (not shown) to become a plurality of partial luminous fluxes. These partial luminous fluxes are inputted into a polarization conversion element (not shown). The partial luminous fluxes inputted into the polarization conversion element becomes an S-polarizes light, and is outputted from the polarization conversion element (not shown). The S-polarized light is condensed by a condenser lens (not shown), and inputted into a cross-dichroic prism (not shown).

The S-polarized light inputted into the cross-dichroic prism is separated into lights of three primary colors of red, blue, and green by this prism. Next, the S-polarized light (not shown) of the separated blue light is passed through a relay lens (not shown), and is inputted into the PBS 4, as shown as an arrow in FIG. 1. An optical path of the inputted S-polarized light is changed for 90° by the dielectric multilayer films 2, and inputted into a reflective spacial light modulation element 5.

The inputted S-polarized light is modulated by a picture signal outputted from a non-shown liquid crystal driver in the reflective spacial light modulation element 5, and reflected to the PBS 4. When it is a P-polarized light which is modulated and reflected, it goes straight without changing its optical path, and transmits through the PBS 4. However, when it is an S-polarized light, since it is reflected again in the dielectric multilayer films 2, it gives a contrast corresponding to a picture. The P-polarized light transmitted through the PBS 4 is inputted in the condenser lens (not shown) via the relay lens (not shown), and condensed. Then, it is inputted into the cross-dichroic prism (not shown).

The optical paths of the other lights of two colors which are separated previously are changed for 90° by the other two PBSs in the same way as the blue light, respectively, and the two lights are polarized and modulated by the reflective spatial light modulation element, respectively. After that, the two lights are reflected, and go straight and transmit through the other two PBSs, respectively, and then, are inputted into the cross-dichroic prism (not shown). The three primary color lights inputted into the cross-dichroic prism (not shown) are synthesized by this prism. Then, the three lights are outputted from the prism, and are projected and reflected as a picture after transmitted through a projector lens.

As shown in Table 2, since the amount of deterioration of the transmittance of the glass in the Example No. 20 according to the present invention is small, reduction of the amount of the projected light is not seen even though the light is passed continuously through the PBS 4 for a long time. Further, since this glass has an excellent light transmittance in the purple region in the visible range, a projected light having good color rendering can be obtained without reducing the amount of a light. Moreover, since the absolute value of the photoelastic constant (β) of this glass is small, a double refraction property, which leads to reduction of the amount of a light, is not generated in the PBS 4 portion.

Further, when PBSs made from the glasses in the Examples (No. 1 to 19) according to the present invention are used, the same effects as the above are obtained.

Next, an (applied) example that the glass in the Example No. 20 according to the present invention is used as an optical system of a polarization conversion element will be explained. A triangular-shaped prism, and moreover, a PBS are made from the triangular-shaped prism, in the same way as the above.

A light having a high output, such as an ultra pressure mercury lamp or the like, is made into a uniform luminous flux via an optical integrator (not shown) formed by a fly eye's lens array or the like. The luminous flux is inputted into the PBS. The luminous flux inputted into the PBS is separated into two linearly polarized lights (P-polarized light and S-polarized light) whose polarization directions are mutually perpendicular. The P-polarized light transmitted through the PBS is converted into an S-polarized light through a polarization rotation optical system (polarization rotation caused by reflection by using the triangular-shaped prism), and is synthesized with the S-polarized light, which is the other light reflected in the PBS. Its polarization conversion efficiency is compared with that of in earlier technology (for example, using a polarization plate). Since the separated P-polarized light is utilized by converting into and synthesizing with the S-polarized light, it has almost twofold of converting efficiency. Therefore, it is suitable for use for utilizing polarization at high efficiency (high-luminance liquid crystal projector).

As shown in Table 2, since the amount of deterioration of the transmittance of the glass in the Example No. 20 according to the present invention is small, reduction of the amount of the projected light is not seen even though a light with high luminance is irradiated continuously for a long time. Moreover, the absolute value of the photoelastic constant (β) of this glass is small, a double refraction property by a thermal stress caused by temperature rise in accordance with irradiation of a light, or by a mechanical stress when an optical system is made (evaporation of a film or sticking of prisms), is not generated. Therefore, this glass is also excellent in polarization holding property.

Further, when PBSs made from the glasses in the Examples No. 1 to No 19 according to the present invention, respectively, are used, the same effects as the above are obtained.

As described above, since the optical glass according to the present invention, comprises $SiO_2$; PbO; $B_2O_3$; not less than 0.1 mass % of $TeO_2$; and not less than 0.4 mass % of $Li_2O$, it is suitable for using for an optical element, such as a lens, a prism or the like, or a substrate, in particular, it is suitable for using for an optical element in polarization optical system, or a light polarization control element, such as a PBS, an SLM, a polarization conversion element or the like, the glass whose deterioration rate of transmittance caused by irradiating a ray in an ultraviolet range and/or a visible range being small, the glass having an excellent transmittance to a ray with a wavelength from a long wavelength side to a purple region in the visible range, and bubbles in a melted glass being reduced sufficiently and the glass being excellent in refining properties when the glass is melted and refined, the glass having a small absolute value of a photoelastic constant (β) and a high refractive index.

The entire disclosure of Japanese Patent Application No. 2001-161194 filed on May 29, 2001 including specification, claims, drawings and summary are incorporated herein by reference in its entirety.

What is claimed is:

1. An optical glass consisting of:
   18 to 29 mass of $SiO_2$;
   66 to 78 mass % of PbO;
   0.1 to 3.5 mass % of $TeO_2$;
   0.1 to 6 mass % of $B_2O_3$;
   0.4 to 5 mass % of $Li_2O$;
   0 to 8 mass % of $Na_2O$;
   0 to 8 mass % of $K_2O$;
   a total amount of $Li_2O+Na_2O+K_2O$ being 0.4 to 10 mass %;
   0 to 5 mass % of MgO;
   0 to 5 mass % of CaO;
   0 to 5 mass % of SrO;
   0 to 10 mass % of BaO;
   0 to 5 mass % of ZnO;
   a total amount of MgO+CaO+SrO+BaO+ZnO being 0 to 10 mass %;
   0 to 5 mass % of $GeO_2$;
   0 to 3 mass % of $Al_2O_3$;
   0 to 3 mass % of $Nb_2O_5$;
   a total amount of $GeO_2+Al_2O_3+Nb_2O_5$ being 0 to 5 mass %;
   0 to 1 mass % of $As_2O_3$; and
   0 to 1 mass % of $Sb_2O_3$;
   wherein a refractive index (nd) is in a range of 1.75 to 1.90; and an Abbe number (υd) is not more than 26.0;

and a wavelength of a light which transmits through the glass with a transmittance of 80% including a reflection loss is not more than 420 nm when a thickness of the glass is 10±0.1 mm.; and a deterioration rate of transmittance of a ray having a wavelength of 450 nm when a ray in at least one of an ultraviolet region and a visible region is irradiated with an irradiance of 2.2 W·cm$^{-2}$ for ten minutes is not more than 3.0%.

2. The optical glass as claimed in claim 1, wherein the deterioration rate of transmittance of the ray having the wavelength of 450 nm when the ray in at least one of the ultraviolet region and the visible region is irradiated with the irradiance of 2.2 W·cm$^{-2}$ for ten minutes is not more than 1.0%.

3. The optical glass as claimed in claim 1, wherein an absolute value of a photoelastic constant (β) in a wavelength range of 400 to 800 nm is not more than $1.0 \times 10^{-5}$ nm/cm/Pa.

4. The optical glass as claimed in claim 1, consisting of:

18 to 29 mass % of $SiO_2$;
66 to 78 mass % of PbO;
0.1 to 3.5 mass % of $TeO_2$;
0.1 to less than 2 mass % of $B_2O_3$;
0.4 to 5 mass % of $Li_2O$;
0 to 8 mass % of $Na_2O$;
0 to 8 mass % of $K_2O$;
a total amount of $Li_2O+Na_2O+K_2O$ being 0.4 to 10 mass %;
0 to 5 mass % of MgO;
0 to 5 mass % of CaO;
0 to 5 mass % of SrO;
0 to 10 mass % of BaO;
0 to 5 mass % of ZnO;
a total amount of MgO+CaO+SrO+BaO+ZnO being 0 to 10 mass %;
0 to 5 mass % of $GeO_2$;
0 to 3 mass % of $Al_2O_3$;
0 to 3 mass % of $Nb_2O_5$;
a total amount of $GeO_2+Al_2O_3+Nb_2O_5$ being 0 to 5 mass %;
0 to 1 mass % of $As_2O_3$; and
0 to 1 mass % of $Sb_2O_3$.

* * * * *

UNITED STATES PATENT AND TRADEMARK OFFICE
CERTIFICATE OF CORRECTION

PATENT NO. : 6,756,334 B2
DATED : June 29, 2004
INVENTOR(S) : Michiko Ogino et al.

It is certified that error appears in the above-identified patent and that said Letters Patent is hereby corrected as shown below:

Column 1,
Line 24, replace "," at the end of the paragraph with -- . --

Column 2,
Line 30, replace "a" with -- $\delta$ --.
Line 36, replace "$\delta=\beta x dx F$" with -- $\delta=\beta \cdot d \cdot F$ --.

Column 3,
Line 46, replace the first occurrence of "," with -- . --.

Column 5,
Lines 42 and 53, replace "2.2 W.cm$^{-2}$" with -- 2.2 W·cm$^{-2}$ --.

Column 6,
Line 66, replace "or" with -- of --.

Signed and Sealed this

Fifteenth Day of February, 2005

JON W. DUDAS
*Director of the United States Patent and Trademark Office*